April 14, 1953     R. L. BROWN     2,634,472
RESILIENT STUD FASTENER FOR CYLINDRICAL OBJECTS
Filed April 11, 1950

INVENTOR.
ROBERT L. BROWN
BY
ATTORNEY

Patented Apr. 14, 1953

2,634,472

UNITED STATES PATENT OFFICE 2,634,472

RESILIENT STUD FASTENER FOR CYLINDRICAL OBJECTS

Robert L. Brown, Ferndale, Mich.

Application April 11, 1950, Serial No. 155,302

1 Claim. (Cl. 24—81)

This invention relates to a snap fastener and more particularly to a spring steel fastener of the type for securing parts, such as cables, conduits and the like, to a supporting member.

It is an object of the invention to provide a fastener which may be applied to the part to be attached and to secure the fastener in gripping engagement with the support at the same time the part is applied.

Another object of the invention is to provide a fastener having spring tensioned gripping parts which may be advanced toward each other by localized pressure on another part of the fastener during assembly, one of the spring gripping parts being fulcrumed on the part which is to be secured to the supporting member.

Other objects and advantages of the invention will more fully appear from the following description taken in connection with the accompanying drawings in which.

Figure 1:
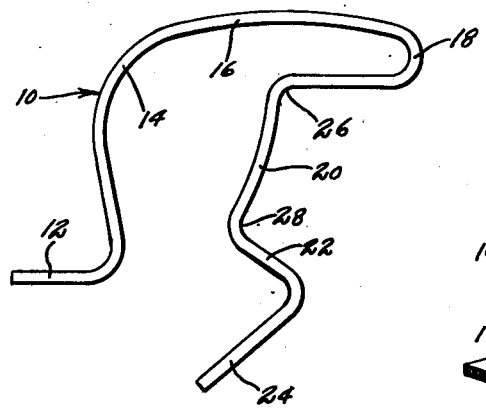
Fig. 1 is a side elevational view of the fastener before it is applied to the part to be supported and the supporting member.
Figure 2:
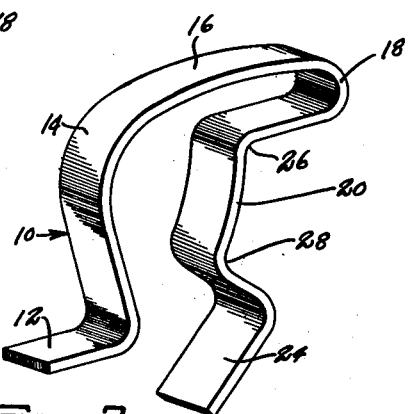
Fig. 2 is a perspective view of the fastener.

Referring to the drawings, I have shown a fastener, preferably formed from sheet metal spring steel. The fastener comprises, generally, an outwardly extending holding flange section 12, an arcuate contact section 14, a head section 16, an outwardly extending finger section 18, a movable arcuate contact section 20, a holding flange section 22, and a guide section 24. The strip of spring steel is formed to the shape illustrated in Fig. 1 and has been shown as applied to a conduit C, it being understood that the fastener may be applied to other devices, such as rods, cables, tubes and the like. The head section 16 and finger section 18 form a U-shaped portion extending generally at right angles to the contact sections 14 and 20.

The outwardly extending holding flange section 12 functions as a hook for projecting through an opening O in a support S and engages the under surface of the support S. The arcuate contact section 14 is shaped to fit a portion of the outer surface of the part C to be secured to the support S. The head section 16 extends outwardly from the part to be supported tangentially to the part C forming an area for the application of pressure. The outwardly extending finger section 18 is formed by reversely bending the strip material back under the head section 16. The movable arcuate contact section 20 engages a side of the supported part C opposite to the section 14 and normally is spaced from the section 14 a distance less than the thickness of the supported part. The holding section 22 is adapted to engage the under surface of the support S when it is forced through the opening O in the support S. The guide section 24 serves as a spring pressure guide for directing the holding section 22 into the opening O in the support S.

Figure 3:
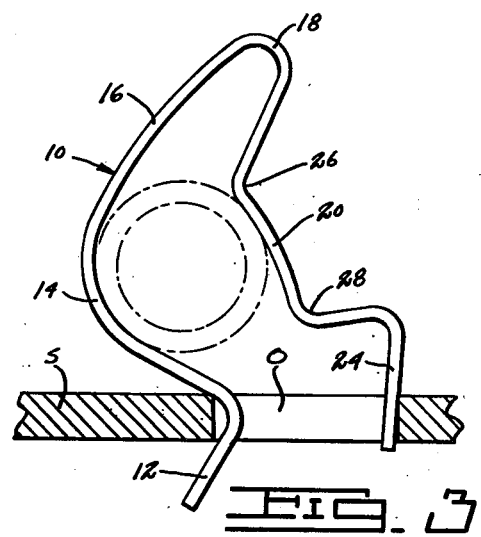
Fig. 3 is a side elevational view of the fastener in position on a supported member and in position to be received in an opening of a supporting member, shown in cross section.
Figure 4:
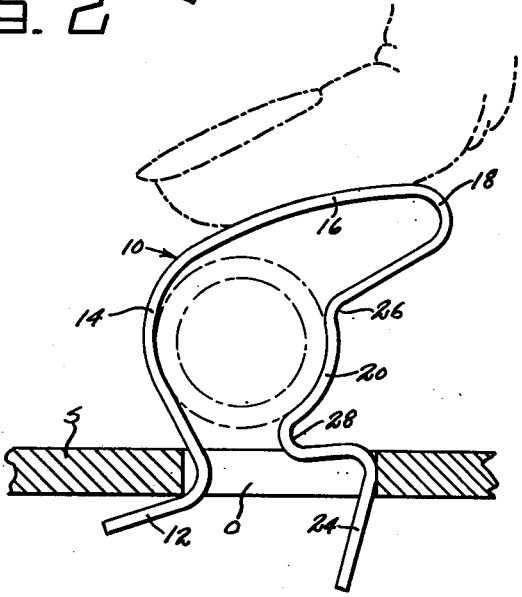
Fig. 4 is a view corresponding to Fig. 3 but showing the position of the fastener parts during assembly when the fastener is only partially assembled.
Figure 5:
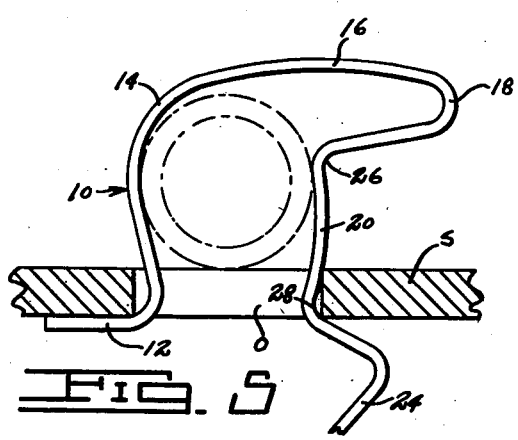
Fig. 5 is a view corresponding to Fig. 3 but showing the position of the fastener parts after final assembly.

The fastener is applied by first spring pressing it over the supported part C and the holding flange section 12 and guide 24 are inserted in the opening O, as illustrated in Fig. 3. The operator then applies a pressure to the head 16 and finger section 18 which causes the movable contact section 20 to wrap around the supported part C, as illustrated in Fig. 4, causing the holding flanges 12 and 22 and guide 24 to be sprung toward each other, the guide 24 sliding on the edge of the opening O until the holding section 22 has passed through the opening O. The spring tension, caused by bending at 26 and the wrapping action of section 20, forces the holding section 22 under the surface of the support S, as illustrated in Fig. 5.

The two sections 12 and 22 then hold the fastener to the support with a spring tension on the supported part to prevent any movement thereof relative to its support. It will be noted from the drawings that there is also a resilient bending at the point indicated at 28.

While the fastener is of the spring metal type, during its application it is easily assembled against its spring action but after assembly it is securely held in position and is not removable by reversing the spring action by movement of the finger section in the opposite direction. It partakes of the nature of a spring lock fastener.

While I have herein illustrated and described a preferred embodiment of the invention, it will be understood that various changes, including the size, shape and arrangement of parts, may be made without departing from the spirit of my invention and it is not my intention to limit its scope other than by the terms of the appended claim.

I claim:

A metal spring fastener comprising a strip of metal stock formed of resilient spring material reversely bent substantially midway between its opposite ends into a U formation portion having a pair of legs, the outer portion of both legs of the U-shaped portion being bent in the same direction substantially at right angles to the leg portions adjacent the U formation portion and being formed arcuate to provide spaced curved gripping portions, the U-shaped bent portion extending laterally from one side of the gripping portions, outwardly and oppositely extending holding flange sections at the outer ends of the leg portions and beyond said gripping portions of the legs, one holding flange portion extending away from the U-shaped portion and the other holding flange extending generally in the same direction as the U-shaped portion, and a guide at the outer free end of said last named holding flange.

ROBERT L. BROWN.

References Cited in the file of this patent

UNITED STATES PATENTS

| Number | Name | Date |
|---|---|---|
| 300,167 | Unangst | June 10, 1884 |
| 2,058,733 | Smith | Oct. 27, 1936 |
| 2,108,347 | Guarnstrom | Feb. 15, 1938 |
| 2,166,916 | Lombard | July 18, 1939 |
| 2,265,393 | Place | Dec. 9, 1941 |